(12) United States Patent
Chaffins et al.

(10) Patent No.: US 9,319,759 B2
(45) Date of Patent: Apr. 19, 2016

(54) OVERHEAD REDUCTION IN ETHERNET PASSIVE OPTICAL NETWORK (EPON)

(71) Applicant: Broadcom Corporation, Irvine, CA (US)

(72) Inventors: Brian Chaffins, Rohnert Park, CA (US);
Eric Lynskey, Rohnert Park, CA (US);
Ryan Hirth, Windsor, CA (US);
Edward Wayne Boyd, Petaluma, CA (US)

(73) Assignee: Broadcom Corporation, Irvine, CA (US)

( * ) Notice: Subject to any disclaimer, the term of this patent is extended or adjusted under 35 U.S.C. 154(b) by 123 days.

(21) Appl. No.: 13/674,648

(22) Filed: Nov. 12, 2012

(65) Prior Publication Data

US 2014/0133855 A1    May 15, 2014

(51) Int. Cl.
*H04Q 11/00* (2006.01)
*H04L 12/28* (2006.01)

(52) U.S. Cl.
CPC ........ *H04Q 11/0067* (2013.01); *H04L 12/2861* (2013.01); *H04Q 2011/0077* (2013.01)

(58) Field of Classification Search
CPC ....................................................... H04B 10/27
USPC ................... 370/445, 412; 398/68, 25, 98, 58
See application file for complete search history.

(56) References Cited

U.S. PATENT DOCUMENTS

| | | | | |
|---|---|---|---|---|
| 7,372,854 B2 * | 5/2008 | Kang | ................. | H04Q 11/0067 370/390 |
| 2006/0209825 A1 * | 9/2006 | Carroll | .................... | H04L 12/66 370/390 |
| 2007/0064721 A1 * | 3/2007 | Garcia-Luna-Aceves | ................... | H04L 12/43 370/445 |
| 2007/0248109 A1 * | 10/2007 | DeCarolis | ............. | H04J 3/1694 370/412 |
| 2008/0212965 A1 * | 9/2008 | Sisto | .................... | H04L 12/5695 398/68 |
| 2009/0052894 A1 * | 2/2009 | Murata | ................. | H04J 3/1694 398/43 |
| 2009/0110403 A1 * | 4/2009 | Kramer | ............. | H04Q 11/0067 398/98 |
| 2009/0304385 A1 * | 12/2009 | Khermosh | .......... | H04J 14/0282 398/58 |
| 2011/0116803 A1 * | 5/2011 | Sone | .................. | H04Q 11/0067 398/98 |
| 2011/0142442 A1 * | 6/2011 | Hirth | .................. | H04Q 11/0067 398/25 |
| 2012/0257893 A1 * | 10/2012 | Boyd | .................. | H04L 12/2801 398/58 |

FOREIGN PATENT DOCUMENTS

PT    WO 2007054387 A1 *    5/2007    .......... H04L 12/2801

* cited by examiner

*Primary Examiner* — David Payne
*Assistant Examiner* — Omar S Ismail
(74) *Attorney, Agent, or Firm* — Sterne, Kessler, Goldstein & Fox, P.L.L.C.

(57) ABSTRACT

Embodiments reduce overhead in Ethernet Passive Optical Network (EPON) networks by reducing the amount of switching among Optical Network Units (ONUs) done by the Optical Line Terminal (OLT). In one embodiment, Logical Link Identifiers (LLIDs) hosted by the same ONU are linked at the OLT such that the OLT grants same ONU LLIDs consecutively when appropriate. This reduces the optics related delay associated with switching among ONUS. At the same time, the linking of LLIDs hosted by the same ONU allows for data from multiple LLIDs to be grouped together within a single Forward Error Correction (FEC) block at the ONU, when appropriate, reducing FEC overhead.

20 Claims, 10 Drawing Sheets

OVERHEAD REDUCTION IN ETHERNET PASSIVE OPTICAL NETWORK (EPON)

FIELD OF THE INVENTION

The present disclosure relates generally to passive optical networks.

BACKGROUND

Background Art

A Passive Optical Network (PON) is a single, shared optical fiber that uses inexpensive optical splitters to divide a single fiber into separate strands feeding individual subscribers. An Ethernet PON (EPON) is a PON based on the Ethernet standard. EPONs provide simple, easy-to-manage connectivity to Ethernet-based equipment, both at customer premises and at the central office. As with other Gigabit Ethernet media, EPONs are well-suited to carry packetized traffic.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. Generally, the drawing in which an element first appears is typically indicated by the leftmost digit(s) in the corresponding reference number.

DETAILED DESCRIPTION OF EMBODIMENTS

Figure 1:
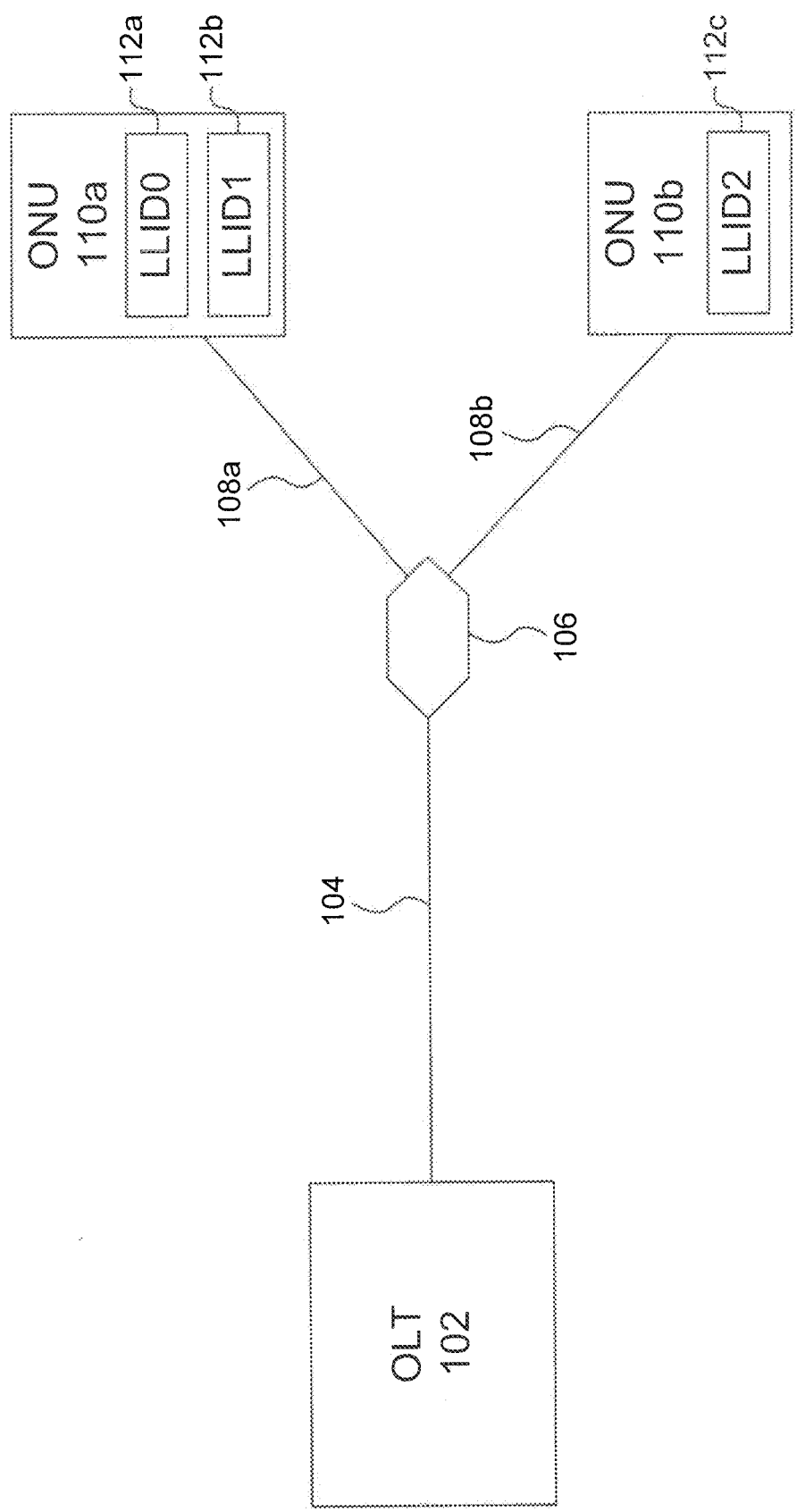
FIG. 1 illustrates an example Ethernet Passive Optical Network (EPON).

FIG. 1 illustrates an example Ethernet Passive Optical Network (EPON) 100. Example EPON 100 is provided for the purpose of illustration only and is not limiting of embodiments of the present disclosure. As shown in FIG. 1, example EPON 100 includes an Optical Line Terminal (OLT) 102, an optical passive splitter 106, and Optical Network Units (ONUs) 110a and 110b.

OLT 102 typically sits at a central office (CO) of the network and is coupled to a fiber optic line 104. OLT 102 may implement a DOCSIS (Data Over Cable Service Interface Specification) Mediation Layer (DML) which allows OLT 102 to provide DOCSIS provisioning and management of network components. Additionally, OLT 102 implements an EPON Media Access Control (MAC) layer (e.g., IEEE 802.3ah or 802.3av). Optionally, passive splitter 106 can be used to split fiber optic line 104 into a plurality of fiber optic lines 108a-b. This allows multiple subscribers, such as ONUs 110a and 110b, which may be in different geographical areas, to be served by the same OLT 102 in a point-to-multipoint topology.

ONUs 110a-b may include units that typically sit at the subscriber's end of the network, or coaxial media converters (CMCs) that bridge between an EPON network and a coaxial network to form an EPON over Coaxial (EPOC) network. ONUs 110a-b may each serve one or more end user devices (not shown in FIG. 1). The end user devices may provide one or more services (e.g., Voice over Internet Protocol (VoIP), High Definition TV (HDTV), etc.) at a single subscriber's unit and/or at a multi-dwelling unit (MDU).

ONUs 110a-b share fiber optic line 104 in a time division multiplexing (TDM) manner for upstream communication to OLT 102. To avoid collisions, OLT 102 uses the Multi-point Control Protocol (MPCP) (a Medium Access Control (MAC) level protocol) to synchronize ONUs 110a-b to the same timing reference, allow for a discovery and registration process for new ONUs, and schedule upstream transmissions from ONUs 110a-b.

The discovery and registration process allows OLT 102 to discover and register new ONUs that wish to join the network. The process includes OLT 102 periodically broadcasting a MPCP Discovery GATE message. The Discovery GATE message specifies a discovery time slot, within which a new ONU can send a request for registration to OLT 102. To join the network, a new ONU responds to a MPCP Discovery GATE message by sending a MPCP REGISTER_REQ message, which contains the ONU's MAC address. Upon receiving the REGISTER_REQ message from the ONU, OLT 102 registers the ONU and assigns it a Logical Link identifier (LLID). OLT 102 then sends the assigned LLID to the ONU in a MPCP REGISTER message. Separately, in a MPCP GATE message, or in the REGISTER message, OLT 102 then grants the ONU a transmission time slot. The ONU responds by sending a MPCP REGISTER_ACK, message in the granted time slot, terminating the registration process.

One or more LLIDs can be assigned to the same ONU as described in co-owned U.S. Pat. No. 7,436,765, titled "Method and Apparatus for Dynamically Allocating Upstream Bandwidth in Passive Optical Networks," which is incorporated herein by reference in its entirety. For example, referring to FIG. 1, ONU 110a is assigned two LLIDs 112a and 112b, while ONU 110b is assigned a single LLID 112c. Typically, LLIDs are assigned randomly. As a result, an ONU may or may not be assigned LLIDs with consecutive numbers.

For upstream data transmissions, ONUs 110a-b send MPCP REPORT messages to OLT 102 in order to receive time grants for upstream transmission. A REPORT message for a given LLID indicates the status (e.g., fill-level) of an upstream data queue associated with the LLID (LLID queue). An ONU that hosts multiple LLIDs, such as ONU 110a in FIG. 1, may send the status of its LLID queues in one or multiple REPORT messages to OLT 102.

MPCP REPORT messages may be sent by ONUs 110a-b in response to polling GATE messages from OLT 102, which poll ONUs 110a-b for LLID queue status, or may be piggy-backed to data transmissions. OLT 102 responds to MPCP REPORT messages from ONUs 110a-b by sending unicast GATE messages to ONUs 110a-b. A unicast GATE message grants a particular ONU/LLID pair a time slot for upstream transmission. The granted ONU/LLID pair then transmits data from its queue in the assigned time slot.

OLT 102 may employ a variety of algorithms to determine the order in which ONU/LLID pairs are granted time slots for upstream transmission. For example, OLT 102 may use a fairness-based algorithm that further supports multiple Quality of Service (QoS) levels among ONU/LLID pairs. Sometimes, the determined order may require OLT 102 to switch back and forth between ONUs. For example, referring to FIG. 1, OLT 102 may grant in this order LLID0 112a, LLID2 112c, and then LLID1 112b, requiring OLT 102 to switch back and forth between ONU 110a and ONU 110b.

Typically, when switching from ONU to ONU, delay is incurred due to the time needed for the optics (e.g., laser) in one ONU to turn off and the optics in the other ONU to turn on. Additional delay is also incurred due to the time needed for the receiver at OLT 102 to synchronize each time to the transmitting ONU. These delays contribute to what is referred to herein as overhead in an EPON network, which reduces the upstream bandwidth utilization efficiency.

Another source of overhead specific to 10 Gbit/s (10 G) EPON networks is due to mandatory Forward Error Correction (FEC), which is applied on a 255-byte block level rather than on a frame level as in 1 Gbit/s (1 G) EPON. This FEC mechanism requires the OLT to grant an ONU/LLID pair with only a small amount of data (e.g., 64 bytes) a time slot that is large enough for sending an FEC encoded 255-byte block.

Embodiments of the present disclosure, as further described below, reduce overhead in EPON networks by reducing the amount of switching among ONUs done by the OLT. In one embodiment, LLIDs hosted by the same ONU (same ONU LLIDs) are linked at the OLT such that the OLT grants same ONU LLIDs consecutively (without other LLIDs being granted in between) when appropriate. This reduces the optics related delay associated with switching among ONUs. At the same time, the linking of LLIDs hosted by the same ONU allows for data from multiple LLIDs to be grouped together within a single FEC block at the ONU, when appropriate, reducing FEC overhead.

Embodiments will now be described with respect to exemplary OLT implementations. These implementations are provided for the purpose of illustration only and are not limiting. As would be understood by a person of skill in the art based on the teachings herein, embodiments may be implemented in a variety of other ways without departing from their scope.

Figure 2:
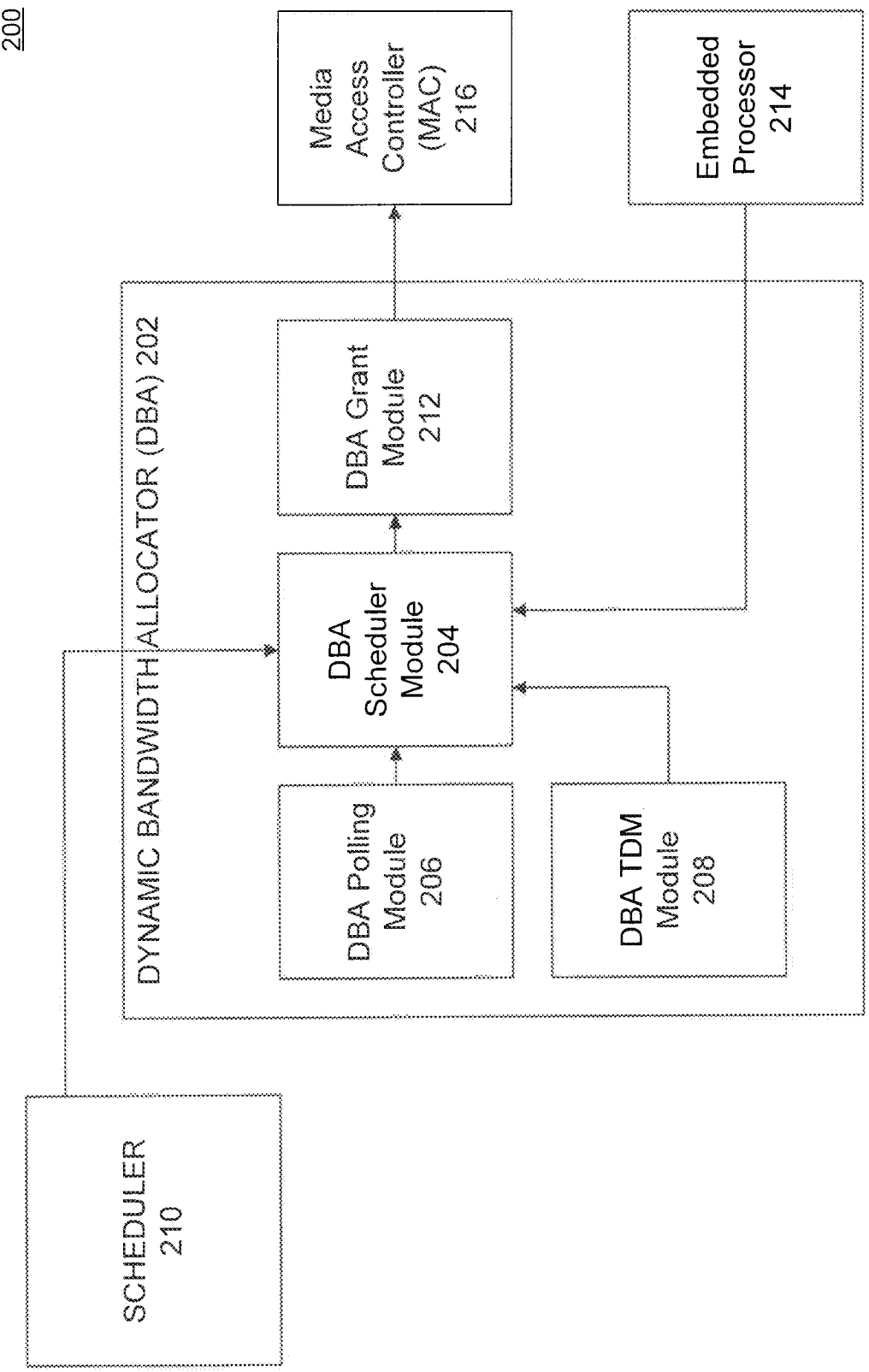
FIG. 2 illustrates an example Optical Line Terminal (OLT) according to an embodiment of the present disclosure.

FIG. 2 illustrates an example Optical Line Terminal (OLT) 200 according to an embodiment of the present disclosure. Example OLT 200 is provided for the purpose of illustration only and is not limiting. Example OLT 200 may be used to implement embodiments as further discussed below. As shown in FIG. 2, example OLT 200 includes a Dynamic Bandwidth Allocator (DBA) module 202, a scheduler module 210, an embedded processor 214, and a Media Access Control (MAC) module 216. DBA module 202 includes a DBA scheduler module 204, a DBA polling module 206, a DBA Time Division Multiplexing (TDM) module 208, and a DBA grant module 212. As would be understood by a person of skill in the art, OLT 200 may include additional modules not shown in FIG. 2.

For purposes of this discussion, the term "module" shall be understood to include at least one of software, firmware, and hardware (such as one or more circuits, microchips, or devices, or any combination thereof), and any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

In an embodiment, scheduler module 210, DBA polling module 206, DBA TDM module 208, and embedded processor 214 each can send grant requests to DBA scheduler module 204. A grant request as used herein is a request to DBA scheduler module 204 to cause a GATE message to be sent or broadcast on the network granting a time slot for upstream transmission. As further described below, different grant request types can be supported by OLT 200. For example, grant requests may be issued for the purpose of servicing a particular LLID having a non-empty queue or for initiating a discovery and registration interval for new ONUs to join the network. DBA scheduler module 204 selects which among the grant requests it receives is serviced next, and provides this information to DBA grant module 212. DBA grant module 212 schedules the grant in MAC 216.

Scheduler module 210 is configured to issue grant requests for servicing LLIDs with non-empty queues. Typically, scheduler module 210 receives queue status information from ONUs, piggy-backed onto upstream data transmissions in the form of MPCP REPORT messages. Additionally, scheduler module 210 may receive queue status information from ONUs in response to polling GATE messages sent out by OLT 200 to particular ONUs. Scheduler module 210 issues grant requests to DBA scheduler module 204 based on queue status information.

In an embodiment, scheduler module 210 issues grant requests to DBA scheduler module 204 according to a fairness-based algorithm, which may further support different QoS levels across ONUs and/or ONU/LLID pairs. For example, scheduler module 210 may implement a weighted-deficit round-robin algorithm to select a grant request for sending to DBA scheduler module 204.

In an embodiment, as further described below with reference to FIGS. 4-8, scheduler module 210 maintains a service linked list of LLIDs that ensures that same ONU LLIDs are granted consecutive time slots whenever possible. The service linked list is updated by scheduler module 210 based, in part, on information received from DBA scheduler module 204. For example, DBA scheduler module 204 sends an activation/de-activation signal to scheduler 210 whenever a non-zero/zero (non-empty/empty queue) REPORT message is received for a particular LLID pair. This enables/disables a link in the linked list for that particular LLID. Scheduler module 210 cycles through enabled links, and for each enabled link, determines if the LLID associated with the link is within its service level. If scheduler module 210 determines that an LLID is due for service, it sends a grant request for the LLID to DBA scheduler module 204.

DBA polling module 206 is configured to send a polling grant request to DBA scheduler module 204 whenever an LLID in a maintained polling list is determined to have an expired last polling time. The last polling time for a particular LLID is the time at which a last REPORT message was received from the LLID. A LLID has an expired last polling time when the current time exceeds the last polling time by greater than a selected poll interval and no REPORT message has been received from the ONU/LLID pair (piggy-backed to a data transmission). In an embodiment, DBA polling module 206 cycles periodically through LLIDs in the polling list, checking the polling status of each LLID. In another embodiment, some LLIDs in the polling list can be disabled such that DBA polling module 206 may skip checking their polling status.

In an embodiment, as further described below with reference to FIG. 3, the polling list maintained by DBA polling module 206 is a linked list, in which same ONU LLIDs are linked. As such, when cycling the list, DBA polling module 206 will check the polling status of same ONU LLIDs in a consecutive fashion. This causes polling grants, when needed, to be sent to same ONU LLIDs consecutively and for any resulting upstream REPORT messages from same ONU LLIDs to be transmitted in consecutive time slots to the OLT.

DBA TDM module 208 is configured to send periodic high-priority grant requests (TDM grant requests) to DBA scheduler module 204 for servicing latency-sensitive LLIDs. In an embodiment, LLIDs for latency-sensitive services (e.g., VoIP) are mapped to DBA TDM module 208. DBA TDM module 208 maintains a list of such LLIDs, with respective grant length and period for each LLID. In an embodiment, DBA TDM module 208 issues TDM grant requests for maintained LLIDs in a round-robin fashion. In another embodiment, DBA TDM module 208 may implement a linked list, similar to the polling linked list, so that TDM grant requests to same ONU LLIDs are grouped consecutively. Alternatively, DBA TDM module 208 may share the same list (implemented as a two-tiered list) with DBA polling module 206.

Embedded processor 214 may also be configured by firmware to send grant requests to DBA scheduler module 204. In an embodiment, embedded processor 214 is configured to send grant requests to DBA scheduler module 204 periodically to initiate discovery and registration intervals. Other types of processor-initiated grant requests may also be used. In an embodiment, embedded processor 214 maintains a firmware master list of LLIDs, which may also be a linked list in order to group same ONU LLIDs together. This causes processor-initiated grants to be sent to same ONU LLIDs consecutively.

DBA scheduler module 204 is configured to select the order in which grant requests that it receives from scheduler module 210, DBA polling module 206, DBA TDM module 208, and/or embedded processor 214 are serviced. In an embodiment, DBA scheduler module 204 services received grant requests according to a priority order. For example, DBA schedule module 204 may service TDM grant requests from DBA TDM module 208 first, followed by polling grant requests from DBA polling module 206, processor-initiated grant requests from embedded processor 214, and finally grant requests from scheduler module 210. Other priority orders ma also be used.

In addition to selecting the servicing order, DBA scheduler module 204 also determines a time slot value for the grant request selected for service. DBA scheduler module 204 then provides the grant request selected for service and the associated time slot value to DBA grant module 212. DBA grant module 212 forms a grant based on the grant request and associated time slot value, schedules the grant for forwarding to MAC 216, and then forwards the grant to MAC 216 at a scheduled time. In an embodiment, DBA grant module 212 enqueues the grant in a buffer of outgoing grants of MAC 216, MAC 216 processes its outgoing grants buffer in a first-in-first-out (FIFO) manner, placing each grant in a respective MPCP GATE message and transmitting the GATE message onto the network. In an embodiment, up to four outstanding grants per ONU can be present in the buffer of MAC 216.

Figure 3:
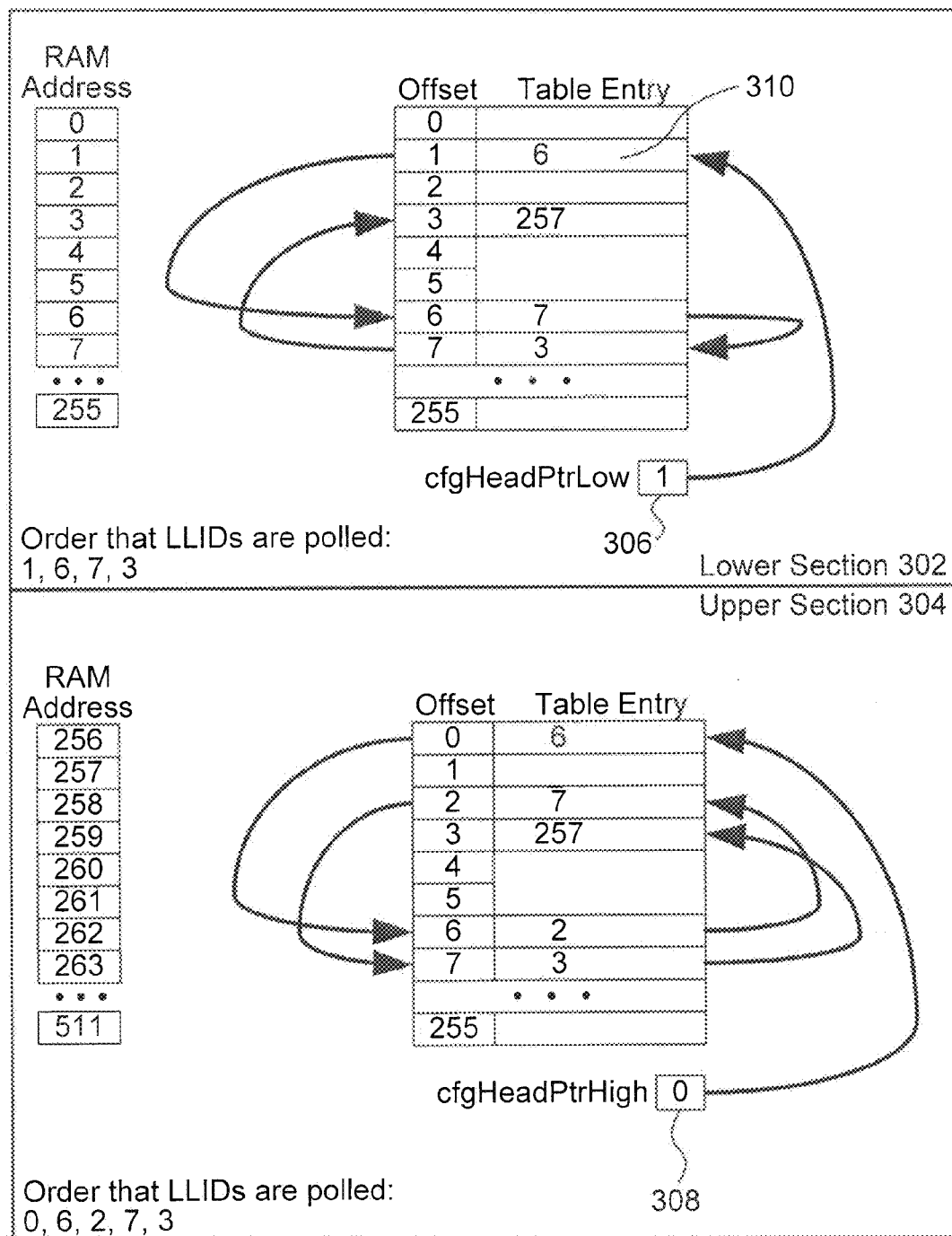
FIG. 3 illustrates an example polling linked list according to an embodiment of the present disclosure.

FIG. 3 illustrates an example polling linked list 300 according to an embodiment of the present disclosure. Example polling list 300 is provided for the purpose of illustration and is not limiting of embodiments. As described above, polling linked list 300 may be maintained by a polling module, such as DBA polling module 206. Entries corresponding to same ONU LLIDs are linked in list 300 so that the polling module checks them for polling eligibility in a consecutive fashion. As a result, when more than one LLID belonging to the same ONU are eligible for polling, polling grants are sent to the ONU consecutively, and any resulting upstream REPORT messages are transmitted in consecutive time slots to the OLT. This increases the utilization efficiency of the EPON network.

In an embodiment, as shown in FIG. 3, polling linked list 300 is implemented using a Random Access Memory (RAM) with twice as many entries (RAM addresses) as LLIDs. It is noted that embodiments are not limited to RAMs that support 256 LLIDs as shown in FIG. 3, but can be extended to any number of LLIDs (e.g., 512, 1024, 2048, etc.). In an embodiment, the RAM is divided into a lower section 302 (lower offset RAM addresses) and an upper section 304 (upper offset RAM addresses). Lower section 302 and upper section 304 may be equal in size. At any given time, only one of lower section 302 and upper section 304 is used by DBA polling module 206 to issue polling grants, while the other section is made available for update (e.g., by software) to add/remove entries.

When a section is in use by DBA polling module 206, a head pointer indicates the first LLID to check for polling eligibility. In the example shown in FIG. 3, when lower section 302 is used, head pointer 306 indicates that polling eligibility check should start at memory offset or LLID 1. The entry stored in a memory offset provides the next memory offset or LLID to check for polling eligibility. For example, in FIG. 3, entry 310 of memory offset 1 indicates that the next memory Offset or LLID to check for polling eligibility is 6. Thus, for example, DBA polling module 206 will check LLID 1, then LLID 6, then LLID 7, then LLID 3, and so on.

In an embodiment, a polling cycle terminates when an entry of pre-determined value (e.g., 2049) is read. After a polling cycle is complete, DBA polling module 206 determines whether software updates require that a switch to the unused section be made. If yes, then DBA polling module 206 switches to the other section by using the other head pointer. In an embodiment, after switching to upper section 304, the MSB (most significant bit) of the entry read from the RAM is inverted to determine the next memory offset. For example, referring to FIG. 3, when the table entry associated with RAM address 256 (containing the value 6) is read, the entry's MSB is inverted to result in next memory offset 262.

Figure 4:
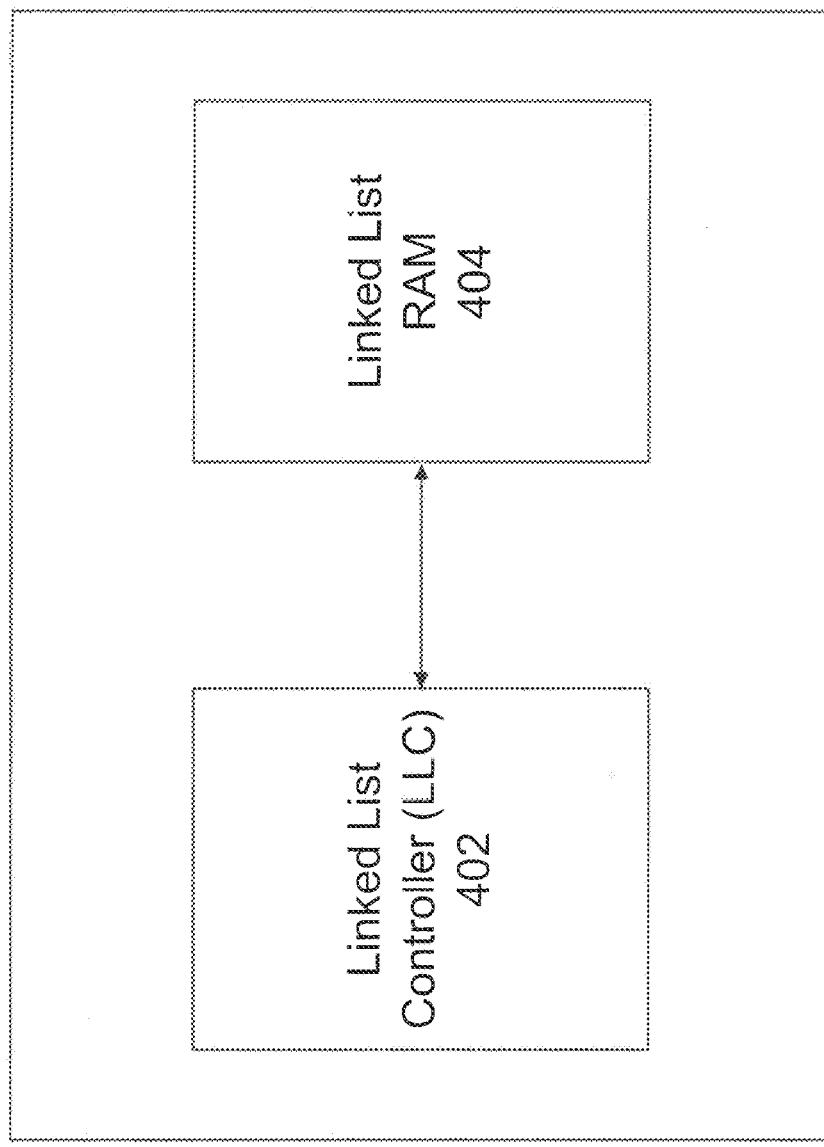
FIG. 4 illustrates an example scheduler module according to an embodiment of the present disclosure.

FIG. 4 illustrates an example scheduler module 400 according to an embodiment of the present disclosure. Example scheduler module 400 is provided for the purpose of illustration and is not limiting of embodiments. Example scheduler module 400 may be an embodiment of scheduler module 210 described above in FIG. 2.

As shown in FIG. 4, example scheduler module 400 includes a linked list controller (LLC) 402 and a linked list RAM 404. LLC controls RAM 404 to ensure that entries (links) for same ONU LLIDs are linked in the list. This allows for same ONU LLIDs, which are within their respective service levels, to be granted consecutive time slots for upstream transmission.

In an embodiment, LLC 402 maintains the list in RAM 404 up-to-date by cycling through the links in the list, adding or removing links based on shaping profiles and queue status changes of LLIDs (empty to non-empty and non-empty to empty). A shaping profile for a particular LLID is a profile that ensures that upstream traffic from LLIDs is shaped in conformance with a service level agreement (SLA) associated with the LLID.

In an embodiment, LLC 402 performs the following types of updates on the linked list of RAM 404: a) adding a link for a given LLID when the LLID queue changes from empty to non-empty; b) adding a link for a given LLID when the LLID is within a range for service based on its shaping profile; c) removing a link for a given LLID when the LLID queue changes from non-empty to empty; d) removing a link for a given LLID when the LLID is no longer within a range of service based on its shaping profile; and e) removing a link for a given LLID based on a processor command.

Figure 5:
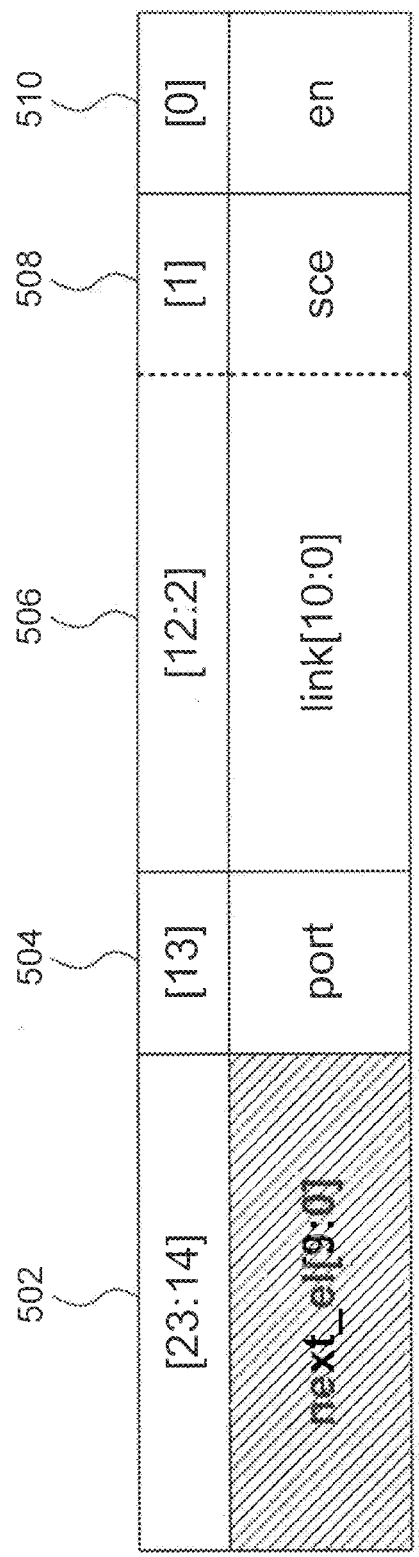
FIG. 5 illustrates an example linked list entry according to an embodiment of the present disclosure.

FIG. 5 illustrates an example linked list entry (link) 500 according to an embodiment of the present disclosure. Example linked list entry 500 is provided for the purpose of illustration only and is not limiting of embodiments. Example linked list entry 500 may be an entry of linked list RAM 404. As described above, each entry in the linked list corresponds to a particular LLID.

As shown in FIG. 5, example linked list entry 500 includes a next element field 502, a port field 504, a link field 506, a shaper field 508, and an enable field 510. Next element field 502 indicates the next element in the list checked by LLC 402 after the current element associated with entry 500. In an embodiment, as further described below, LLC 402 uses the next element field 502 to ensure that same ONU LLIDs are linked together whenever the linked list is updated.

Port field 504 indicates a port number for the LLID that corresponds to entry 500. Link field 506 indicates a link number for the LLID that corresponds to entry 500. In an embodiment, the scheduler module maintains a one-to-one mapping between link numbers and LLIDs. Shaper field 508 is a one-bit field that indicates whether the link is within its range of service. In an embodiment, the scheduler module supports a separate background process that performs this check for all links in the list and that updates the shaper field 508 of each entry accordingly. Enable field 510 is a one-bit field that indicates whether the link is active or inactive. An inactive link is not checked by the scheduler as it cycles through the list. As such, enable field 510 provides the option for maintaining a link in the list without update by the scheduler. For example, a link that would have been removed from the list by the scheduler if checked can be disabled and thus maintained in the list.

Figure 6:
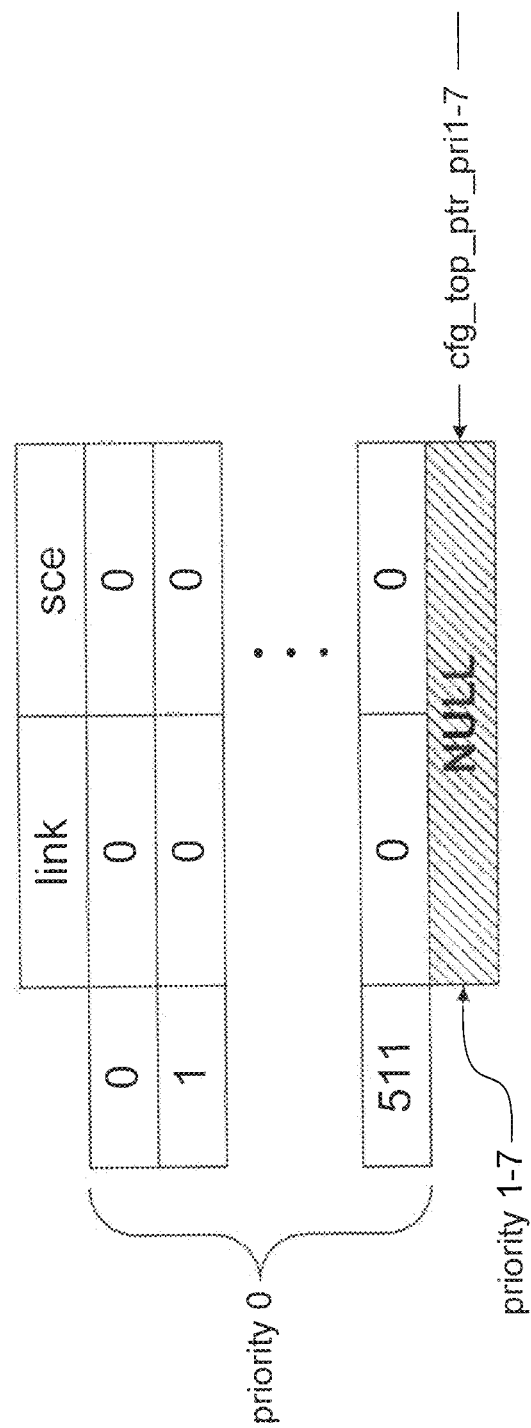
FIG. 6 illustrates an example linked list after initialization according to an embodiment of the present disclosure.

FIG. 6 illustrates an example linked list 600 after initialization according to an embodiment of the present disclosure. Example linked list 600 is provided for the purpose of illustration only and is not limiting of embodiments. In this embodiment, linked list 600 supports priority ordering such that links of the same priority are maintained grouped within a contiguous address space. For example, links of the lowest priority level (e.g., priority 0) are grouped in the lowest address spaces and links of the highest priority level (e.g., priority 7) are grouped in the highest address spaces. Within each of these priority groups of links, links can be linked together in order to be scheduled consecutively for grants.

In an embodiment, in order to define the boundaries between priority levels, a set of top pointers are provided to define the start addresses of priority levels. For example, priority level 0 starts at address 0. Initially after reset, as shown in FIG. 6, linked list 600 is empty and all of the top pointers point at a NULL location in the list (the NULL location does not represent a real location in the physical RAM). This initial condition means that all elements are in priority level 0 after initialization.

Figure 7:
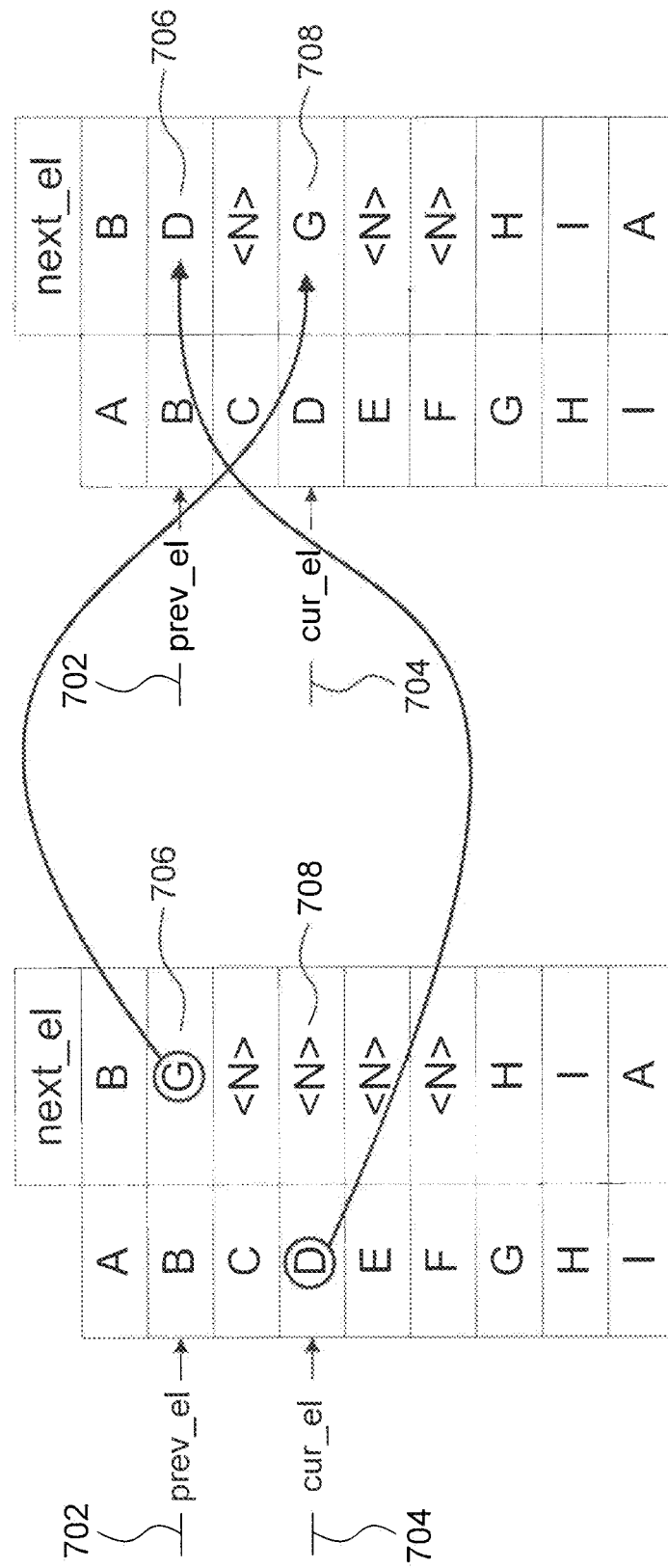
FIG. 7 is an example that illustrates a linking of elements in an example linked list according to an embodiment of the present disclosure.
Figure 8:
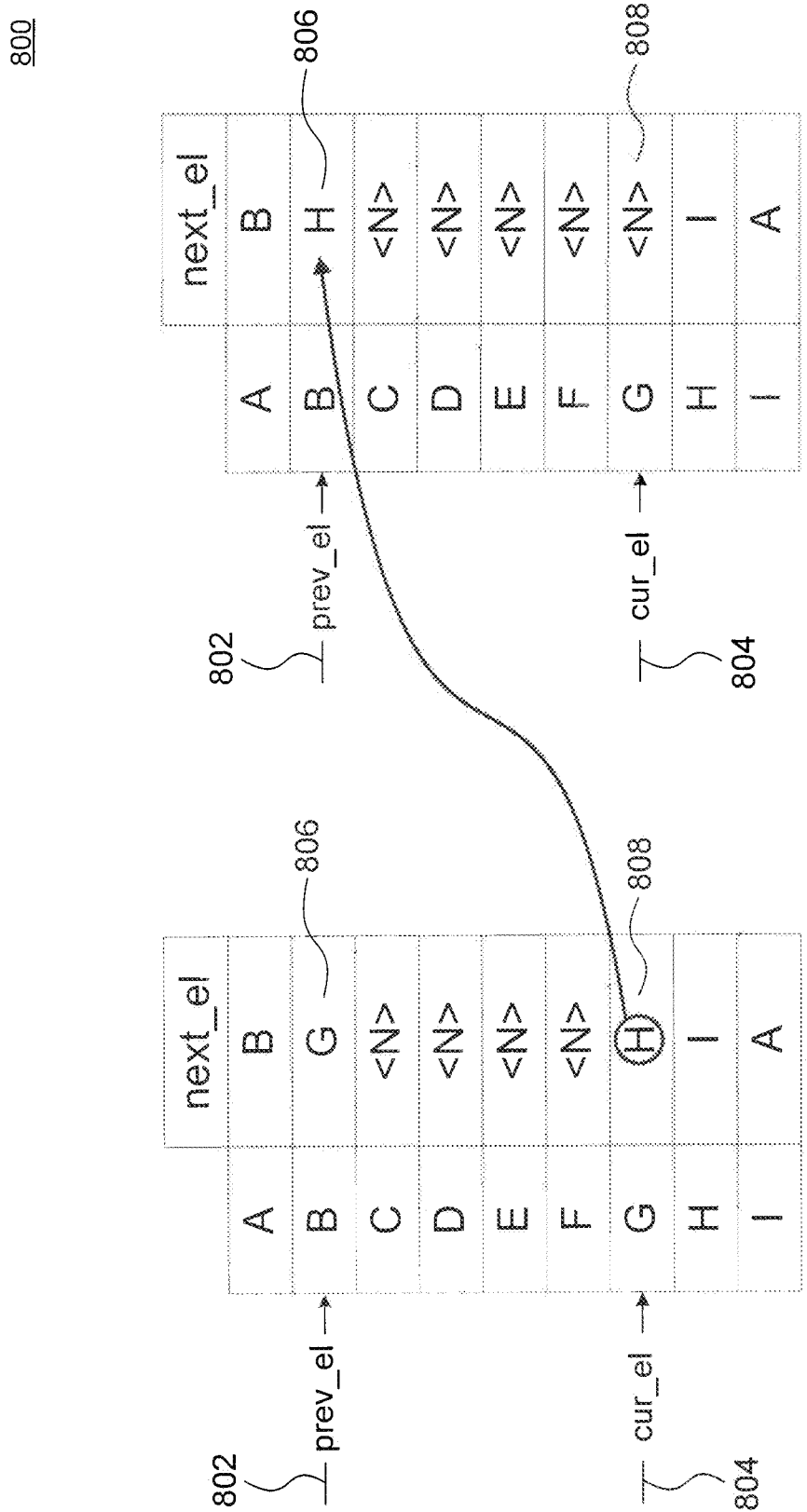
FIG. 8 is an example that illustrates an unlinking of elements in an example linked list according to an embodiment of the present disclosure.

Subsequently, the top pointers are provisioned by software such that there are enough elements in each priority level to accommodate all services on the EPON for each ONU. Once the linked list is configured and ready for service, links are enabled to allow LLC 402 to begin linking/unlinking elements in the list as appropriate. In an embodiment, LLC 402 maintains two pointers for enabling linking/unlinking in the list. The pointers includes a previous element pointer, which points to the last non-NULL element encountered in the list, and a current element pointer, which points to the current element selected for update. FIGS. 7 and 8, described below, illustrates the linking and unlinking of elements using these two pointers.

FIG. 7 is an example 700 that illustrates a linking of elements in an example linked list according to an embodiment of the present disclosure. Example 700 is provided for the purpose of illustration and is not limiting. In example 700, the current element being updated (linked) is element D, which is pointed to by current element pointer (cur_el) 704. Element D may be an element that was previously added to the list or that has just been added to the list. The previous element pointer (prev_el) 702 points to element B. Element B may be an element associated with the same ONU as element D such that linking element D to element B results in grants to LLIDs associated with elements B and D being provided consecutively by the OLT.

Before the update, a next element field 706 of element B contains the current element (G) linked to element B, and a next element field 708 of element D contains a NULL character, which indicates the presence of no next element. To link element D to element B, LLC 402 first writes the value contained in next element field 706 of element B into next element field 708 of element D. Then, LLC 402 writes the value of current element pointer 704 into next element field 706 of element B. As a result of the linking, element B now points to element D, which in turn points to element G (which was previously pointed to by element B).

FIG. 8 is an example 800 that illustrates an unlinking of elements in an example linked list according to an embodiment of the present disclosure. Example 800 is provided for the purpose of illustration and is not limiting. In example 800, the current element being updated is element G, which is pointed to by current element pointer (cur_el) 804. The previous element pointer (prev_el) 802 points to element B.

As shown in FIG. 8, before the update, element G is linked to element B by figuring in next element field 806 of element B. A next element field 808 of element G points to element H. To unlink element G from element B, LLC 402 writes the value contained in next element field 808 of element G into next element field 806 of element B, and then sets the value of next element field 808 of element G to a NULL character. As a result of the unlinking, element B now points to element H, which was previously pointed to by element G. Element G has been unlinked and has no next element to point to.

Figure 9:
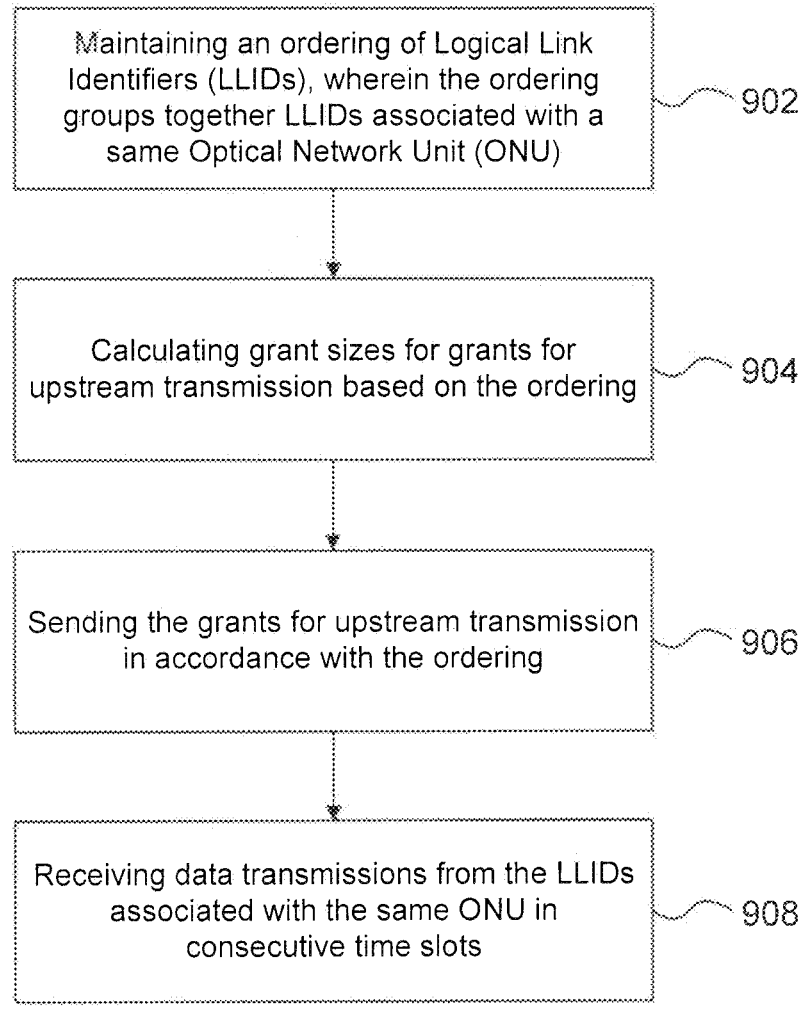
FIG. 9 is a flowchart of an example process according to an embodiment of the present disclosure.

FIG. 9 is a flowchart of an example process 900 according to an embodiment of the present disclosure. Example process 900 is provided for the purpose of illustration only and is not limiting of embodiments. Process 900 may be performed by an OLT, such as OLT 200, for example.

As shown in FIG. 9, process 900 begins in step 902, which includes maintaining an ordering of LLIDs, wherein the ordering groups together LLIDs associated with a same ONU. In an embodiment, step 902 includes maintaining a list of LLIDs, wherein the LLIDs associated with the same ONU are linked together in the list of LLIDs. For example, the list may be similar to linked list 300 described above in FIG. 3 or linked list 404 described above in FIGS. 4-8. As such, step 902 may be performed by a scheduler module, such as scheduler module 210, a polling module, such as DBA polling module 206, a TDM module, such as DBA TDM module 208, or a processor, such as embedded processor 214.

Subsequently, in step 904, process 900 includes calculating grant sizes for grants for upstream transmission based on the ordering. Specifically, step 904 includes accounting for the back-to-back scheduling and/or overlap of upstream transmission slots to be granted to same ONU LLIDs based on the ordering.

In an embodiment, step 904 is preceded or followed by a step of processing the list of LLIDs, where the processing includes processing the LLIDs associated with the same ONU consecutively. For example, in an embodiment, the list of LLIDs may be a service list, and the processing may include checking the LLIDs associated with the same ONU consecutively for service eligibility. In another embodiment, the list may be a polling status list, and the processing may include checking the LLIDs associated with the same ONU consecutively for polling eligibility. As such, the transmitted grants may include grants to the same ONU for consecutive upstream transmission time slots.

Subsequently, in step 906, process 900 includes sending grants for upstream transmission in accordance with the ordering. In an embodiment, step 906 is performed by a MAC module, such as MAC 216. Accordingly, step 906 may further include placing the grants in respective MPCP GATE messages and transmitting the GATE messages onto the network.

Process 900 terminates in step 908, which includes receiving data transmissions from the LLIDs associated with the same ONU in consecutive time slots. In another embodiment, step 908, alternatively or additionally, includes receiving MPCP REPORT messages from the LLIDs associated with the same ONU in consecutive time slots. As such, process 900 reduces EPON overhead by reducing the need to switch among ONUs serviced by the OLT.

In an embodiment, the data transmissions from the LLIDs include a Forward Error Correction (FEC) encoded block that combines data from multiple LLIDs. Accordingly, overhead due to FEC block encoding requirements of 10 G EPON can be reduced.

Figure 10:
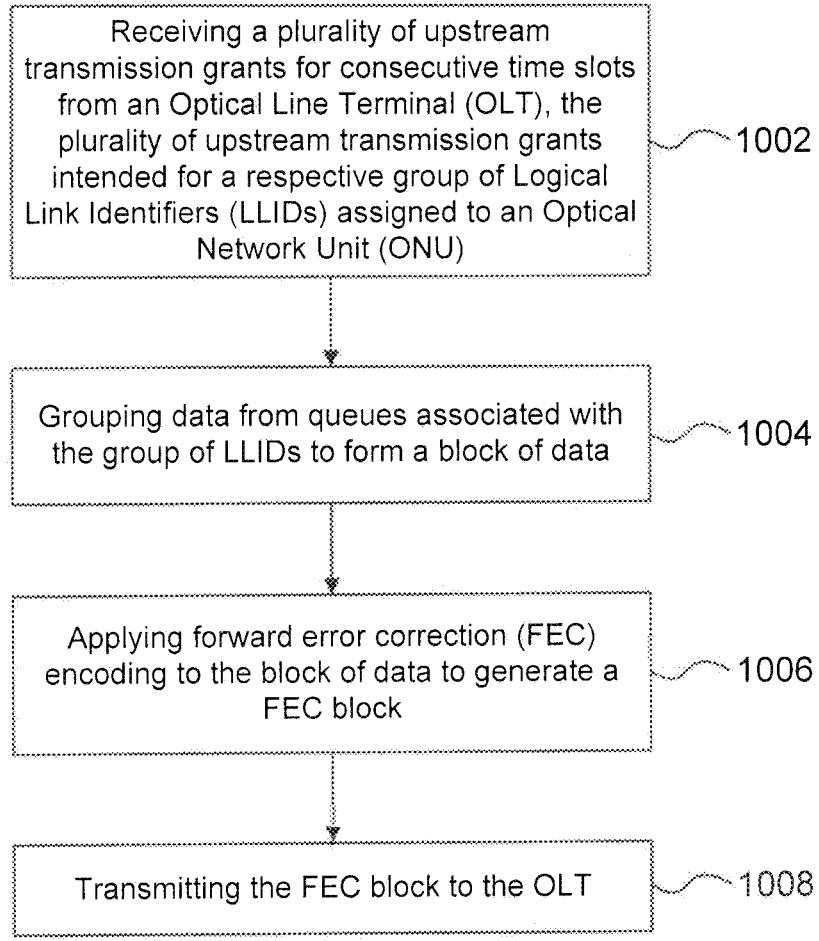
FIG. 10 is a flowchart of an example process according to an embodiment of the present disclosure.

FIG. 10 is a flowchart of an example process 1000 according to an embodiment of the present disclosure. Example process 1000 is provided for the purpose of illustration only and is not limiting of embodiments. Example process 1000 may be performed by an ONU, including a CMC, for example.

As shown in FIG. 10, process 1000 begins in step 1002, which includes receiving a plurality of upstream transmission grants for consecutive time slots from an OLT, the plurality of upstream transmission grants intended for a respective group of LLIDs of a plurality of LLIDs assigned to the ONU.

In step 1004, process 1000 includes grouping data from queues associated with the group of LLIDs to form a block of data. In an embodiment, the data is grouped from queues having fill levels that are not aligned to the block size for FEC block encoding. Subsequently, step 1006 includes applying FEC encoding to the block of data to generate a FEC block across the misaligned data between the grants. Process 1000 terminates in step 1008, which includes transmitting the FEC block to the OLT.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments, but should be defined only in accordance with the following claims and their equivalents.

What is claimed is:

1. A method, comprising:
    maintaining, by an Optical Line Terminal (OLT), a polling status list of Logical Link Identifiers (LLIDs) associated with a plurality of Optical Network Units (ONUs), the polling status list including a respective entry for each LLID of the LLIDs, wherein entries of LLIDs associated with a same ONU of the plurality of ONUs are linked together within the polling status list;
    processing the polling status list, wherein processing the polling status list comprises processing the entries of the LLIDs associated with the same ONU consecutively; and
    in response to said processing, sending, by the OLT, polling grants to an ONU of the plurality of ONUs, the polling grants corresponding to respective LLIDs associated with the ONU, the respective LLIDs being eligible for polling, and wherein sending the polling grants comprises sending the polling grants in first consecutive time slots to the ONU.

2. The method of claim 1, wherein said processing further comprises:
    checking the entries of the LLIDs associated with the same ONU consecutively for polling eligibility.

3. The method of claim 1, further comprising:
    issuing a polling grant request for a LLID of the LLIDs if the LLID is polling eligible.

4. The method of claim 1, wherein maintaining the polling status list of LLIDs comprises maintaining the polling status list based on LLID polling status information.

5. The method of claim 1, further comprising:
    calculating grant sizes for the polling grants sent to the ONU, wherein said calculating comprises accounting for back-to-back scheduling of upstream transmission slots granted by the polling grants to the ONU.

6. The method of claim 1, further comprising:
    receiving data transmissions from the respective LLIDs associated with the ONU in second consecutive time slots.

7. The method of claim 6, wherein the data transmissions include a Forward Error Correction (FEC) encoded block that combines data from multiple ones of the respective LLIDs associated with the ONU.

8. The method of claim 1, further comprising:
receiving Multipoint Control Protocol (MPCP) REPORT messages from the respective LLIDs associated with the ONU in second consecutive time slots.

9. An Optical Line Terminal (OLT), comprising:
a polling module configured to:
maintain a polling status list of Logical Link Identifiers (LLIDs) associated with a plurality of Optical Network Units (ONUs), the polling status list including a respective entry for each LLID of the LLIDs, wherein entries of LLIDs associated with a same ONU are linked together within the polling status list, and
process the polling status list such that the entries of the LLIDs associated with the same ONU are processed consecutively; and
a Media Access Controller (MAC) configured to:
in response to the polling module processing the polling status list, send polling grants to an ONU of the plurality of ONUs in first consecutive time slots, the polling grants corresponding to respective LLIDs associated with the ONU, the respective LLIDs being eligible for polling.

10. The OLT of claim 9, further comprising a scheduler module configured to maintain a service list of LLIDs, wherein the LLIDs associated with the same ONU are listed consecutively in the service list.

11. The OLT of claim 10, wherein the scheduler module is further configured to process each LLID in the service list for service eligibility, and wherein the scheduler module processes the LLIDs associated with the same ONU consecutively.

12. The OLT of claim 9, further comprising:
a dynamic bandwidth allocator (DBA) scheduler module configured to receive polling grant requests for the respective LLIDs associated with the ONU and to issue the polling grants based on the polling grant requests.

13. The OLT of claim 9, wherein the MAC is configured to receive data transmissions from the respective LLIDs associated with the ONU in second consecutive time slots.

14. An Optical Line Terminal (OLT), comprising:
a polling module configured to:
maintain a polling status list of Logical Link Identifiers (LLIDs) associated with a plurality of Optical Network Units (ONUs), the polling status list including a respective entry for each LLID of the LLIDs, wherein entries of LLIDs associated with a same ONU are linked together within the polling status list;
process the polling status list such that the entries of the LLIDs associated with the same ONU are processed consecutively; and
generate, based on processing the polling status list, polling grant requests, the polling grant requests corresponding to respective LLIDs associated with an ONU of the plurality of ONUs, the respective LLIDs being eligible for polling; and
a scheduler module, coupled to the polling module, configured to receive the polling grant requests.

15. The OLT of claim 14, further comprising a grant module, coupled to the scheduler module, configured to:
form a polling grant based on a polling grant request of the plurality of polling grant requests and a corresponding time slot value.

16. The OLT of claim 15, further comprising:
a Media Access Controller (MAC), coupled to the grant module, configured to receive the polling grant and process the polling grant.

17. The OLT of claim 14, further comprising:
a time division multiplexing (TDM) module, coupled to the scheduler module, configured to send periodic high-priority grant requests to the schedule module.

18. The OLT of claim 17, wherein the periodic high-priority grant requests correspond to latency-sensitive LLIDs.

19. The OLT of claim 18, wherein the TDM module is further configured to maintain a list of the latency-sensitive LLIDs.

20. The OLT of claim 14, further comprising:
an embedded processor configured to:
maintain, in firmware, a master list of the LLIDs, and
send a second plurality of polling grant requests to the scheduler module based on the master list of LLIDs.

* * * * *